(12) United States Patent
Carminati et al.

(10) Patent No.: US 7,789,206 B2
(45) Date of Patent: Sep. 7, 2010

(54) DISK FOR A DISK BRAKE

(75) Inventors: Fabiano Carminati, Mozzo (IT); Marco Nervosi, Milan (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 1176 days.

(21) Appl. No.: 10/512,200

(22) PCT Filed: Apr. 23, 2002

(86) PCT No.: PCT/IT02/00268

§ 371 (c)(1),
(2), (4) Date: Aug. 9, 2005

(87) PCT Pub. No.: WO03/091592

PCT Pub. Date: Nov. 6, 2003

(65) Prior Publication Data

US 2006/0000680 A1    Jan. 5, 2006

(51) Int. Cl.
*F16D 65/12* (2006.01)
(52) U.S. Cl. .............................. 188/218 XL; 188/18 A
(58) Field of Classification Search ............... 188/18 A, 188/218 XL; 267/164; 403/397; 301/6.1, 301/6.8
See application file for complete search history.

(56) References Cited

U.S. PATENT DOCUMENTS

| | | | | | |
|---|---|---|---|---|---|
| 4,501,346 | A | * | 2/1985 | Bogenschutz | ......... 188/218 XL |
| 4,662,482 | A | * | 5/1987 | Bass | ......................... 188/18 A |
| 4,848,521 | A | * | 7/1989 | Izumine | .................... 188/18 A |
| 6,035,978 | A | * | 3/2000 | Metzen et al. | ........ 188/218 XL |
| 6,247,562 | B1 | * | 6/2001 | Gotti et al. | ............ 188/218 XL |

FOREIGN PATENT DOCUMENTS

| | | |
|---|---|---|
| EP | 0 849 485 A2 | 6/1998 |
| EP | 0849485 A2 * | 6/1998 |
| EP | 0 959 261 A2 | 11/1999 |
| EP | 1 074 757 A1 | 2/2001 |

* cited by examiner

*Primary Examiner*—Robert A Siconolfi
*Assistant Examiner*—Vu Q Nguyen
(74) *Attorney, Agent, or Firm*—Hogan Lovells US LLP

(57) ABSTRACT

A disk for a disk brake is formed in two parts: a braking band which cooperates with a brake caliper to generate the braking torque, and a bell connected to a wheel hub and connected to the braking band by a tangential restraint system which provides for a plurality of protuberances of the band, housed in respective seats of the bell.

The relative axial positioning between the band and the bell is maintained by a connection element fixed firmly to the bell and urging the protuberance constantly towards an abutment element fixed firmly to the bell and arranged on the opposite side of the bell to the connection element.

21 Claims, 4 Drawing Sheets

DISK FOR A DISK BRAKE

BACKGROUND OF THE INVENTION

1. Field of the Invention

The present invention relates to a disk for a disk brake, of the type comprising a braking band associated with a bell.

2. Description of the Related Art

Many disk-brake disk constructions currently provide for the production of two parts: a braking band on which the disk-brake caliper acts in order to generate the braking torque, and the bell, which is fixed to the wheel hub and connected to the braking band.

The connection between the band and the bell is of considerable importance since it ensures the transfer of the braking torque from the band to the bell.

Tangential restraint between the band and the bell is achieved by systems which provide for protuberances of the braking band which are fitted in respective seats of the bell in order to achieve a tangential-restraint system between the band and the bell of particularly simple structure and hence with low production costs. However, these connection systems must provide adequate arrangements for the relative axial positioning between the band and the bell.

There is a need, in particular, to provide a system of connection between the band and the bell of the disk which can ensure the relative axial positioning between the band and the bell and which, at the same time, is of simple and inexpensive construction as well as being able to ensure a long working life, safeguarding the structural integrity of the band and of the bell, at least in the portions thereof which are affected by the connection.

BRIEF SUMMARY OF THE INVENTION

The problem underlying the present invention is to devise a disk for a disk brake which has structural and functional characteristics such as to satisfy the above-mentioned needs and at the same time to overcome the disadvantages mentioned with reference to the prior art. This problem is solved by a disk for a disk brake according to claim 1. Further embodiments of the invention are described in the dependent claims.

BRIEF DESCRIPTION OF THE DRAWINGS

Further characteristics and the advantages of the disk for a disk brake according to the present invention will become clear from the following description of a preferred and non-limiting embodiment thereof, in which.

DETAILED DESCRIPTION OF THE INVENTION

Figure 1:
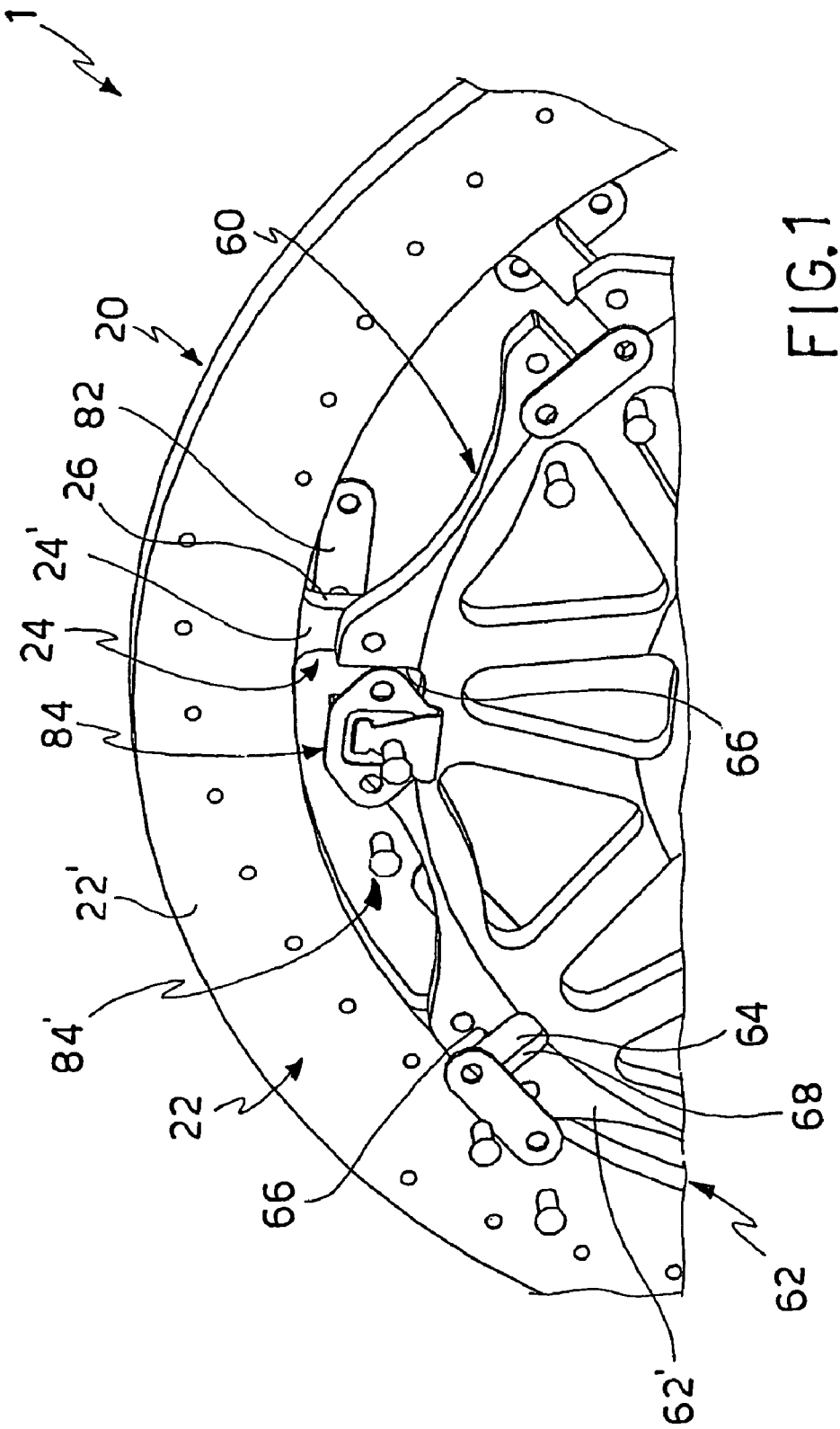
FIG. 1 is a perspective view of a disk comprising a band, a bell and an element for connection between the band and the bell, with parts separated.
Figure 2:
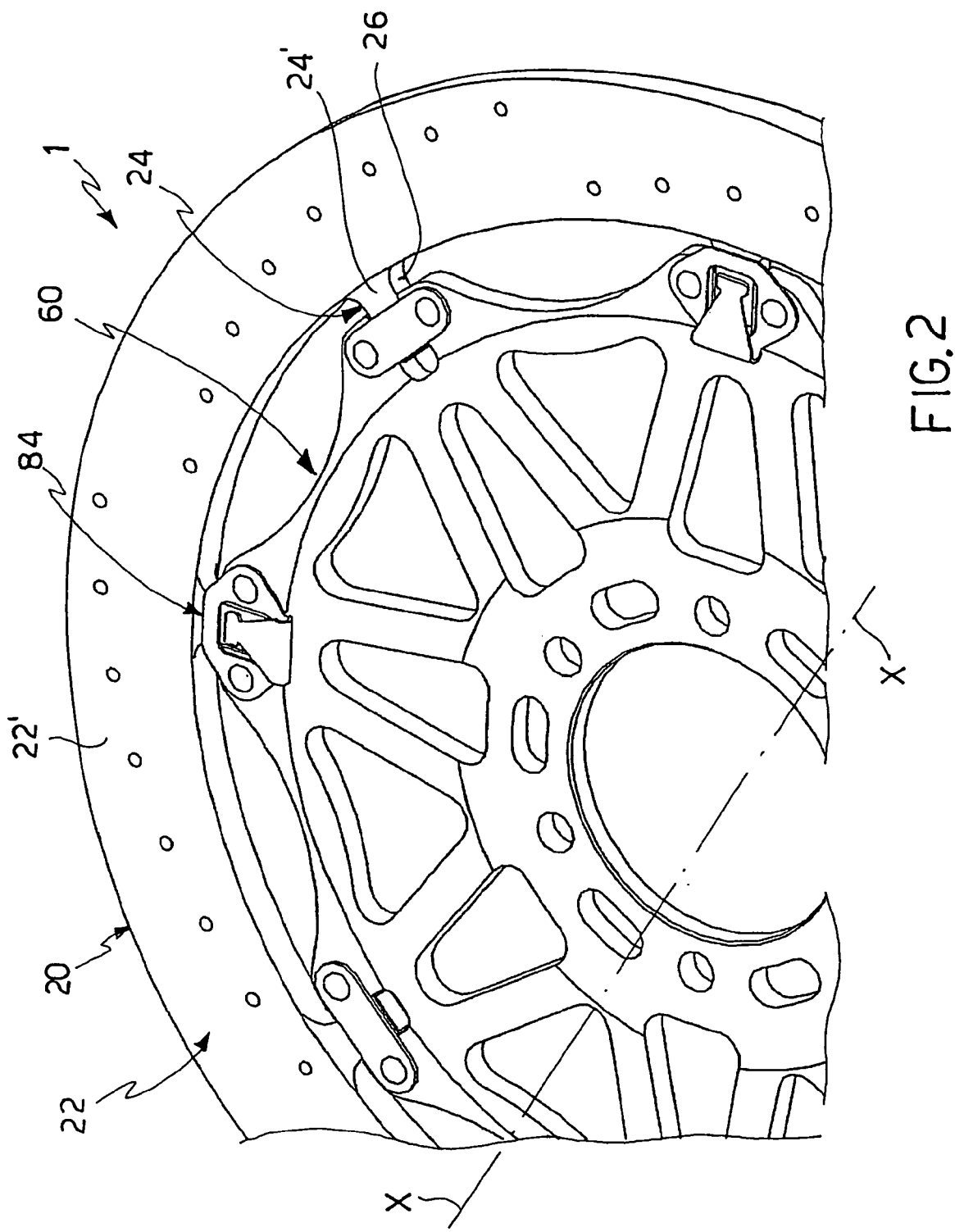
FIG. 2 is a perspective view of the disk of FIG. 1 in an assembled configuration.

With reference to the appended drawings, a disk-brake disk, is generally indicated 1 and is intended mainly for use on motorcycles.

The disk 1, which extends axially symmetrically about a central axis XX, comprises a braking band 20 and a bell 60 which are structurally separate and can be connected. The braking band 20 can be connected to the bell 60 releasably by suitable connection means. Moreover, in a mounted configuration of the disk brake, the bell 60 is intended to be connected to a wheel hub by suitable fixing means which can fix the bell to the hub firmly and releasably.

The braking band 20 comprises a ring 22 defined by a front braking surface 22' and by an opposite braking surface 22", which are substantially flat and perpendicular to the axis of rotation XX of the disk 1. The front braking surface 22' and the opposite braking surface 22" cooperate with a disk-brake caliper (not shown) in order to generate a braking torque which is transmitted from the braking band 20 to the bell 60 by the connection means and is transferred from the bell 60 to the wheel hub by the suitable fixing means, in order to bring about braking of the wheel.

The braking band 20 also comprises at least one protuberance 24 projecting from the ring 22 of the band towards the axis of rotation XX of the disk 1.

In a preferred embodiment, the braking band has a plurality of protuberances 24, the number of protuberances 24 preferably being variable between five and twelve according to the application, and the protuberances 24 preferably being arranged on the ring 22 at regular angular intervals about the axis XX.

The protuberance 24 is defined between a free front surface 24' and an opposed abutment surface 24" which are substantially flat and perpendicular to the axis of rotation XX of the disk 1.

The protuberance 24 is preferably defined circumferentially by a first side 26 and a second side circumferentially opposite the first.

In a preferred embodiment of the braking band, the first side and the second side of the protuberance 24 are substantially flat and preferably parallel to one another.

In the embodiment of the braking band described, the sides of the protuberance 24 are flat and parallel to a radius RR of the protuberance 24 defined by a central radial axis of the protuberance.

The bell 60 of the disk 1 has an annular peripheral portion 62 for the connection of the bell to the band 20.

The annular portion 62 is defined between a front connection surface 62' and an opposed locating surface 62" which are substantially flat and perpendicular to the axis of rotation XX of the disk.

The annular portion 62 of the bell 60 has at least one seat 64 suitable for housing the protuberance 24 of the band 20 for the transfer of the braking torque from the braking band to the bell.

The seat 64 of the bell 60 is defined, circumferentially, between a first lateral surface 66 and a second lateral surface 68 which are advantageously suitable for coupling with the first side 26 and with the second side of the protuberance 24 of the band 20, respectively.

The disk 1 also comprises at least one abutment element suitable for defining an abutment for the abutment surface 24" of the braking band 20.

In a preferred embodiment, the abutment element of the disk 1 is formed by a plate 82, preferably fixed firmly to the bell 60 of the disk 1 by connection means 84' such as rivets, pins, adhesives, welding or the like.

In a preferred embodiment of the abutment element, the plate 82 is fixed firmly to the bell 60 in the region of the locating surface 62" of the annular portion 62 of the bell.

The plate 82 is preferably arranged as a "bridge" between the first lateral surface 66 and the second lateral surface 68 of each seat 64 of the bell so as to form a locating wall suitable for forming an axial abutment for each protuberance 24 of the band 20 housed in the respective seat 64.

The disk 1 also comprises a connection element 84 which cooperates with the band 20 and with the bell 60, maintaining the coupling between the band and the bell. The connection element 84 comprises a fixing portion 86 and an active portion 88.

The fixing portion 86 cooperates with the bell, bearing on the front connection surface 62' of the annular portion 62 of the bell, and the active portion 88 cooperates with the braking band 20, acting on the free front surface 24' of the protuberance 24 of the band.

In a preferred embodiment, the fixing portion 86 and the active portion 84 are formed as a single element, connected to one another by a pliable portion 90.

Preferably, the fixing portion 86 is substantially plate-shaped and suitable to be housed on the annular portion 62 of the bell 60 in the region of each seat 64 of the bell.

The fixing portion 86 also has a window 92, preferably of square or rectangular shape, arranged in a substantially central position within the fixing portion 86.

The fixing portion 86 also has connection lugs 94' and 94" preferably disposed at the sides of the window 92. The connection lugs preferably have connection holes 96' and 96", respectively.

The active portion 88 extends from the fixing portion 86 and is connected thereto by means of the pliable portion 90. The pliable portion 90 is configured in a manner such as to form a bight 96 the concave side of which faces the fixing portion 86.

In other words, the active portion 88 is connected to the fixing portion 86, extending therefrom, and is bent towards the fixing portion 86, defining the bight 96 between the fixing portion and the pliable portion.

The active portion 88, which is preferably configured in the form of a plate, projects from the pliable portion 90.

Figure 3A:
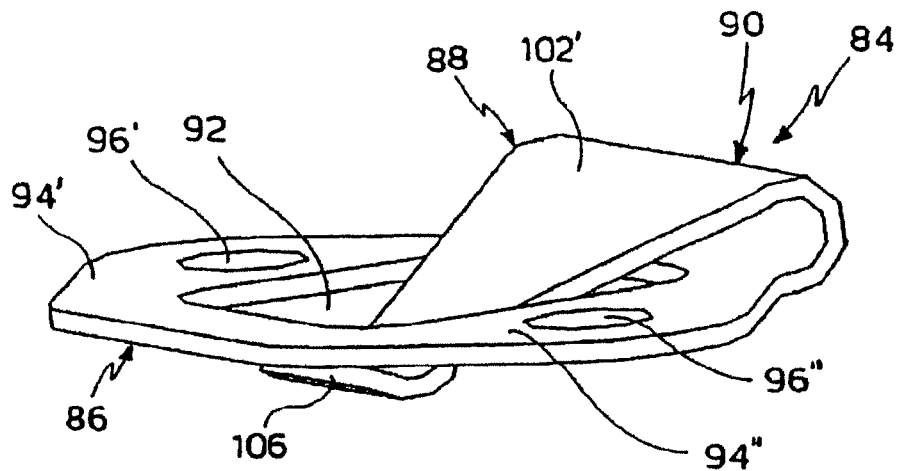
FIGS. 3a and 3b are perspective views of the connecting element of FIG. 1 in an undeformed configuration, that is, in the configuration prior to assembly.
Figure 3B:
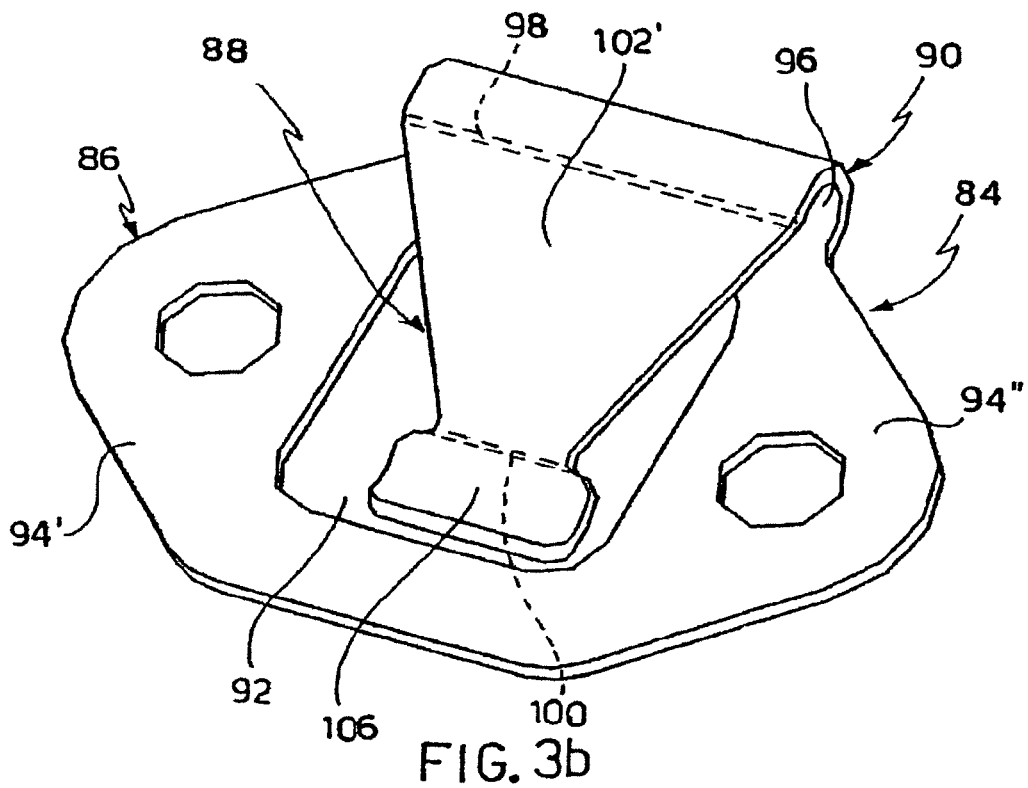
Figure 4:
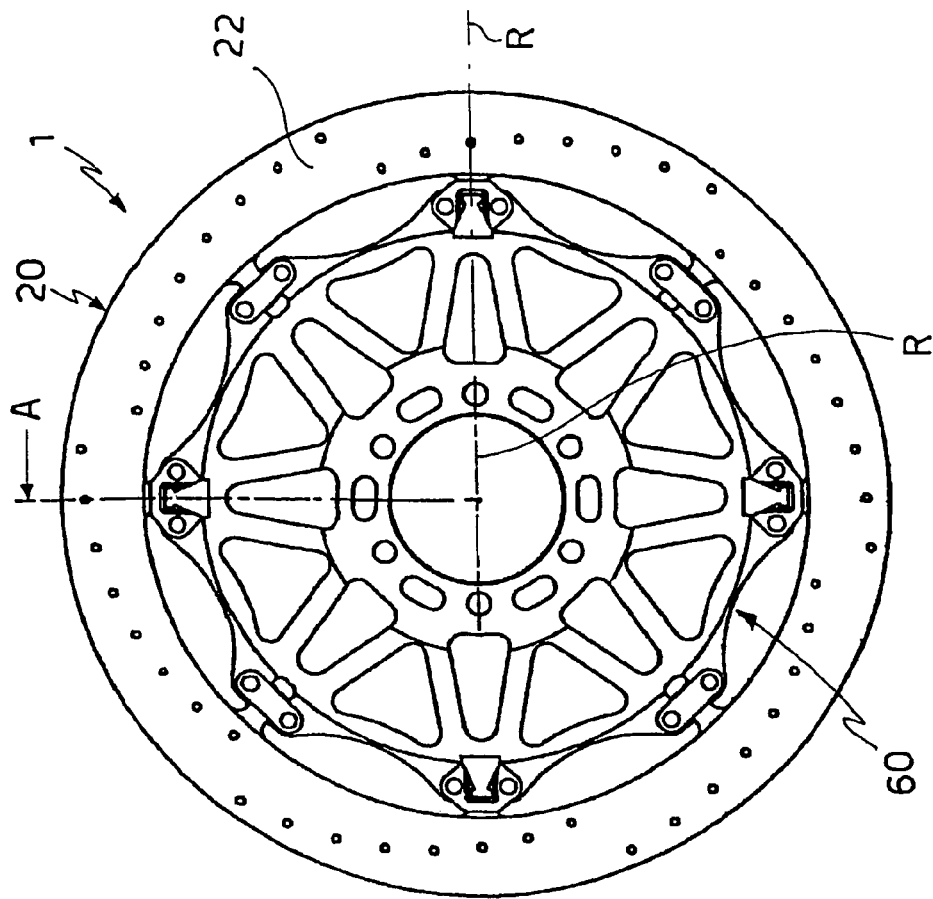
FIG. 4 is a plan view of the disk of FIG. 2.
Figure 5:
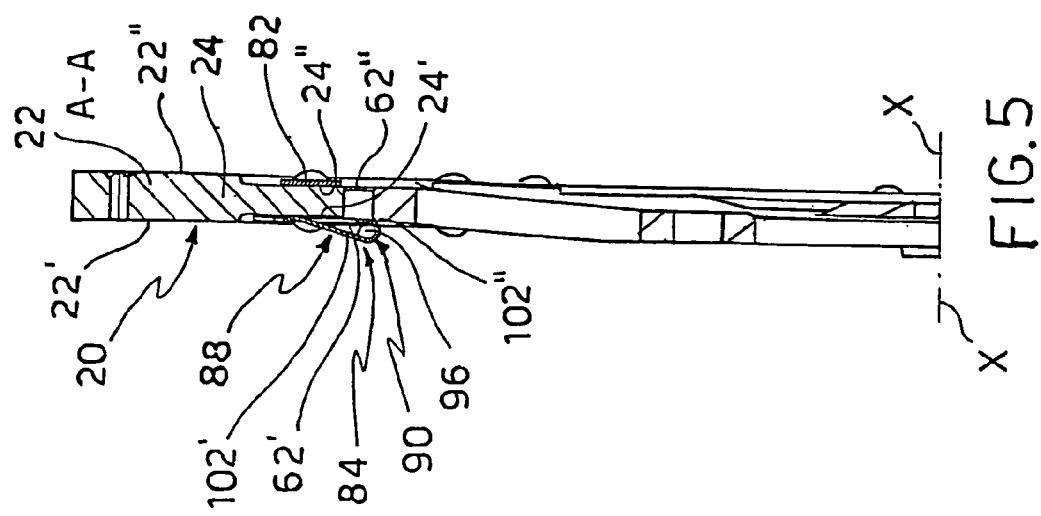
FIG. 5 shows is an enlarged view of the disk, sectioned on the line A of FIG. 4.

In an undeformed configuration of the connection element 84, that is, in the configuration adopted by the connection element 84 prior to its mounting, the active portion 88 projects from the pliable portion 90, extending across the window 92 advantageously provided in the fixing portion 86 (FIGS. 3a and 3b).

In other words, in the undeformed configuration, the active portion 88 of the connection element 84 is arranged across the fixing portion 86 of the connection element, extending across it in the region of the window 92.

In a preferred embodiment, the active portion 88 of the connection element 84 advantageously has a cross-section which is variable, preferably linearly, along the extent of the active portion. In other words, a connecting cross-section 98 of the active portion in the region of the connection with the pliable portion 90 is wider than an end cross-section 100 provided at the end of the active portion.

The active portion 88 of linearly variable cross-section as described above gives the larger faces of the active portion a substantially trapezoidal shape defined by a free face 102' and an inner face 102" facing towards the bight 96 of the connection element.

The active portion 88 of the connection element 84 also comprises, in an end position, a contact protuberance 106 with a curved profile which projects from the active portion 88, and becomes wider.

In a mounted configuration of the disk 1, the braking band 20 and the bell 60 are connected so as to form between them a tangential coupling suitable for transferring the braking torque from the braking band 20 to the bell 60 and an axial coupling suitable for ensuring a stable relative axial positioning between the band and the bell.

In particular, each protuberance 24 of the braking band 20 is housed in the corresponding seat 64 of the bell 60 in manner such that the first side 26 of the protuberance 24 and the second side, opposite the first, face the first lateral surface 66 and the second lateral surface 68 of the seat 64, respectively.

Moreover, the protuberance 24 and the seat 64 are coupled in a manner such as to provide suitable clearance between the first side 26 and the first lateral surface 66 and between the second side and the second lateral surface 68.

Each plate 82, fixed firmly to the locating surface 62" of the bell 60, and arranged as a "bridge" relative to the respective seat 64 with which it is associated, forms an abutment element for the protuberance 24 housed in the seat.

In particular, the band 20 is connected to the bell 60 in a manner such that the abutment surface 24" of the protuberance 24 is arranged facing the plate 82. The protuberance 24 is thus in axial abutment with the plate 82, with the abutment surface 24" bearing against the plate 82.

Each connection element 84 is fixed firmly to the bell 60 by connecting the fixing portion 86 of the connection element 84 to the annular portion 62 of the bell, substantially in the region of each seat 64 formed therein.

In other words, the connection element 84 is fixed firmly to the bell 60 by fixing the connection lugs 94' and 94" of the fixing portion 86 astride the seat 64 so that the window 92 of the connection element opens onto the seat. The active portion 88 of the connection element thus extends towards the free front surface 24' of the protuberance 24 housed in the seat 64.

In the undeformed configuration of the connection element 84, the active portion 88 projecting from the fixing portion 86 is bent onto the portion 86 by means of the pliable portion 90 and extends across the fixing portion 86 in the region of the window 92 formed therein.

The connection element 84 fixed firmly to the bell 60 interacts with the protuberance 24 housed in the seat 64, adopting a deformed configuration.

In the deformed configuration, the active portion 88 is bent, its contact protuberance 106 being urged towards the window 92 by interaction with the protuberance 24. In this configuration, the spring-back of the active portion 88 urges the protuberance 24 against the plate 82 fixed firmly to the bell, keeping the band 20 in axial abutment with the bell 60, ensuring its axial positioning relative thereto.

In particular, in the deformed condition, the contact protuberance 106 of the active portion of the connection element 84 acts on the free surface 24' of the protuberance 24, the contact protuberance 106 being subject to the resilient thrust generated by the bending of the active portion 88 and of the pliable portion 90 of the connection element.

In other words, in the deformed configuration, the deformation of the pliable portion 90 is advantageously added to the bending of the active portion 88, allowing the active portion to act on the protuberance 24 with a resilient force, even in the presence of considerable displacements from its undeformed configuration.

In the mounted configuration, the action of the connection element on the protuberance is thus again a linear resilient action although there is a considerable displacement of the active portion 88 from the undeformed configuration and the resilient force adopts a high intensity.

Should any slight axial movements take place during the use of the disk, or should there be even considerable variations in the axial thickness of the protuberance or of the seat due to large working tolerances, the braking band is thus kept in abutment by resilient forces which are substantially equal to one another even though they are generated by several connection elements each disposed in the region of a protuberance.

In the configuration in which the band 20 is mounted on the bell 60, restrained axially by the system formed by the plate 82 and by the connection element 84, frictional forces are generated between the abutment surface 24" of the protuberance 24 and the surface of the plate 82, as well as between the contact protuberance 106 of the connection element 84 and the free surface 24' of the protuberance 24.

In other words, the axial force exerted by the connection element 84 on the protuberance 24 achieves a forced contact between the abutment surface 24" of the protuberance 24 and the surface of the plate 82 as well as between the contact protuberance 106 of the connection element 84 and the free surface 24' of the protuberance 24.

This forced contact gives rise to the frictional forces. During braking, the braking torque generated on the band 20 is transmitted to the wheel hub by means of the coupling system between each protuberance 24 of the band 20 and the respective seat 64 of the bell, and by means of the bell 60.

In particular, during braking, the braking torque acts on the band 20 so as to move the first side 26 or the second side of the protuberance 24 (alternatively, according to the direction of movement) towards the first lateral surface 66 or the second lateral surface 68 of the seat 64, respectively, producing a braking action on the bell 60.

The coupling between the first side 26 or the second side of the protuberance 24 and the first lateral surface 66 or the second lateral surface 68 of the seat 64, respectively, is achieved substantially over the entire extent of the said sides of the protuberance 24, thus ensuring a large contact surface.

The transfer of the braking torque to the bell is advantageously ensured by each protuberance 24 housed in the respective seat 64 by a particularly compact system with good structural strength, based on the utilization of the entire width of the protuberance 24 between its surfaces 24' and 24".

The frictional force generated between the protuberance 24 of the band 20 and the plate 82, as well as between the protuberance 24 and the connection element 84 holds the protuberance 24 against the first lateral surface 66 or the second lateral surface 68 of the seat 64, preventing the movement permitted by the clearance of the protuberance in the respective seat.

In short, the frictional force is responsible for keeping the band 20 in a fixed circumferential position relative to the bell, preventing the free movement permitted by the clearance of the protuberances in the respective seats from resulting in noisiness of the disk in operation.

Unusually, the disk-brake disk according to the present invention has a connection system between the band and the bell of the disk which can ensure the relative axial positioning between these elements and which, at the same time, is of simple and inexpensive construction and is able to safeguard the structural integrity of the band and of the bell, at least in their portions which are affected by the connection.

The system for the relative axial positioning between the band and the bell can in fact advantageously be associated with a disk for which the tangential restraint between the band and the bell is achieved by the coupling between protuberances provided on the band and seats of the bell which house them.

Advantageously, the tangential restraint has a high degree of structural strength, making use of the entire circumferential width of the protuberances and of the seats for the transfer of the braking torque between the band and the bell. In fact it is clear that the protuberances undergo no structural weakening and participate fully in the transmission of the braking torque.

Moreover, the system for the relative axial positioning between the band and the bell permits connection to the disk whilst avoiding complex machining to be performed on the band or on the bell in order to connect the connection element.

The relative axial positioning system thus enables inexpensive and technologically feasible embodiments to be implemented even with braking bands made of high-tensile or high-hardness steel, or made of composite materials which, as is well known, are difficult to machine.

According to a further advantageous aspect, the axial positioning system according to the invention does not interfere with the coupling between the protuberance and the seat that establishes the tangential restraint.

In other words, this system provides elements which are not in contact with the sides of the protuberance or the lateral surfaces of the seats, thus preventing the action of these elements on these sides or these surfaces from producing cuts, abrasions and the like in these surfaces, in use.

According to a further advantageous aspect, the axial positioning system according to the invention limits the relative angular movements between the band and the bell, eliminating or at least limiting noisiness of the disks.

In other words, the axial force with which the connection element acts on the protuberance, urging it against the abutment element fixed firmly to the bell, develops frictional forces which prevent angular movement of the band relative to the bell, eliminating noisiness of the disk.

In fact it is clear that, at the time of mounting, each protuberance is housed in the respective seat with clearance so that, upon the first use of the disk, the sides of the protuberance will be brought into tangential abutment in the seat and will remain held in this position by the frictional forces which arise between the connection element and the protuberance.

Moreover, according to this advantageous aspect, the frictional forces between the protuberance and the connection element, as well as between the protuberance and the abutment element, damp any vibrations.

Advantageously, moreover, the axial positioning system between the band and the bell does not interfere with the radial expansion which the braking band undergoes as a result of heating due to the braking action.

According to a further advantageous aspect, the relative axial positioning system according to the invention enables fairly large working tolerances to be set for the axial thickness of the protuberances or of the annular portions of the bells.

In other words, the linear resilient action of the active portion of the connection element on the protuberance, which is also maintained for considerable displacements from the undeformed configuration for this active portion, enables large working tolerances of the protuberances and of the annular portions of the bell to be taken up.

Naturally, in order to satisfy contingent and specific requirements, a person skilled in the art will be able to apply many modifications and variations to the above-described disk-brake disk.

For example, in one embodiment of the disk, the axial positioning system described is used in every protuberance-bell coupling.

According to a further variant of the disk-brake disk, the axial positioning system described is used on the protuberance-bell couplings alternately, so as to leave some of these couplings unrestrained axially.

Further modifications and variations applied to the above-described disk-brake disk by a person skilled in the art are to be considered included within the scope of protection of the invention as defined by the appended claims.

What is claimed is:

1. A disk for a disk brake, having an axis of rotation, and comprising:
    a braking band for cooperating with a caliper, generating a braking torque, the band being provided with:
    at least one protuberance projecting towards the axis of rotation of the disk and defined between a free front surface and an opposed abutment surface;
    a bell provided with an annular connection portion defined between a front connection surface and an opposed locating surface, the annular connection portion being provided with at least one seat for housing the protuberance of the band for the transfer of the braking torque from the band to the bell; and
    at least one abutment element for defining an abutment for the abutment surface of the protuberance of the band;
    the disk being characterized in that
    the disk has a plurality of separated connection elements for constantly urging the band in an axial direction and keeping the band in axial abutment with the bell, wherein each connection element comprises a fixing portion which cooperates with the bell, abutting the front connection surface of the bell, and an active portion which cooperates with the braking band, acting on the free front surface of the protuberance housed in the seat of the bell, keeping the abutment surface of the protuberance of the band constantly in abutment with the abutment element of the disk, and wherein the fixing portion has a window through which a contact protuberance attached to the active portion extends and contacts the protuberance of the braking band.

2. A disk for a disk brake according to claim 1 in which the protuberance of the braking band is defined circumferentially by a first side and a second side which are substantially flat and parallel to a central radial axis of the protuberance of the braking band.

3. A disk for a disk brake according to claim 2 in which the seat is defined circumferentially between a first lateral surface and a second lateral surface for coupling with the first side and the second side of the protuberance of the braking band.

4. A disk for a disk brake according to claim 1 in which the protuberance of the braking band is housed in the seat of the bell with circumferential clearance.

5. A disk for a disk brake according to claim 1, in which the fixing portion of the connection element is fixed firmly to the bell.

6. A disk for a disk brake according to claim 5 in which the fixing portion of the connection element is fixed firmly to the front connection surface of the annular connection portion of the bell in the region of the seat by connection means.

7. A disk for a disk brake according to claim 5 in which the active portion of the connection element constantly urges the band of the disk in an axial direction.

8. A disk for a disk brake according to claim 7 in which the active portion of the connection element constantly urges the band of the disk in an axial direction, acting on the free front surface of the protuberance of the braking band housed in the seat.

9. A disk for a disk brake according to claim 1 in which the abutment element comprises a plate.

10. A disk for a disk brake according to claim 9 in which the plate is fixed firmly to the bell in the region of the locating surface of the annular connection portion of the bell.

11. A disk for a disk brake according to claim 10 in which the plate is arranged as a "bridge" relative to the seat, forming a locating wall to act as an axial abutment for the protuberance of the braking band housed in the seat.

12. A disk for a disk brake according to claim 9 in which the active portion of the connection element urges the protuberance of the braking band towards the plate and the fixing portion pulls the bell in the opposite direction.

13. A disk for a disk brake according to claim 1 in which the active portion of the connection element is connected to the fixing portion by a pliable portion.

14. A disk for a disk brake according to claim 1 in which the active portion of the connection element is connected to the fixing portion, extending therefrom and being bent towards the fixing portion, defining with the fixing portion at least one bight.

15. A disk for a disk brake according to claim 1 in which the fixing portion has connection lugs for connecting the fixing portion to the bell.

16. A disk for a disk brake according to claim 1 in which the band is a band for a self-ventilating disk.

17. A disk brake comprising a disk having an axis of rotation and comprising:
    a braking band for cooperating with a caliper, generating a braking torque, the band being provided with:
    at least one protuberance projecting towards the axis of rotation of the disk and defined between a free front surface and an opposed abutment surface;
    a bell provided with an annular connection portion defined between a front connection surface and an opposed locating surface, the annular connection portion being provided with at least one seat for housing the protuberance of the band for the transfer of the braking torque from the band to the bell; and
    at least one abutment element for defining an abutment for the abutment surface of the protuberance of the band;
    the disk being characterized in that
    the disk has a plurality of separated connection elements for constantly urging the band in an axial direction and keeping the band in axial abutment with the bell, wherein each connection element comprises a fixing portion which cooperates with the bell, abutting the front connection surface of the bell, and an active portion which cooperates with the braking band, acting on the free front surface of the protuberance housed in the seat of the bell, keeping the abutment surface of the protuberance of the band constantly in abutment with the abutment element of the disk, and wherein the fixing portion has a window through which a contact protuberance attached to the active portion extends and contacts the protuberance of the braking band.

18. A disk for a disk brake, having an axis of rotation, and comprising:
    a braking band for cooperating with a caliper, generating a braking torque, the band being provided with:
    at least one protuberance projecting towards the axis of rotation of the disk and defined between a free front surface and an opposed abutment surface;
    a bell provided with an annular connection portion defined between a front connection surface and an opposed locating surface, the annular connection portion being provided with at least one seat for housing the protuberance of the band for the transfer of the braking torque from the band to the bell; and
    at least one abutment element for defining an abutment for the abutment surface of the protuberance of the band;

the disk being characterized in that the disk has a plurality of separated connection elements for constantly urging the band in an axial direction and keeping the band in axial abutment with the bell, wherein each connection element comprises a fixing portion which cooperates with the bell, abutting the front connection surface of the bell, and an active portion which cooperates with the braking band, acting on the free front surface of the protuberance housed in the seat of the bell, keeping the abutment surface of the protuberance of the band constantly in abutment with the abutment element of the disk; and the disk has a mounted configuration in which the fixing portion of the connection element is arranged astride the seat in a manner such that a window in the fixing portion opens onto the seat.

19. A disk for a disk brake, having an axis of rotation, and comprising:

a braking band for cooperating with a caliper, generating a braking torque, the band being provided with:

at least one protuberance projecting towards the axis of rotation of the disk and defined between a free front surface and an opposed abutment surface;

a bell provided with an annular connection portion defined between a front connection surface and an opposed locating surface, the annular connection portion being provided with at least one seat for housing the protuberance of the band for the transfer of the braking torque from the band to the bell; and at least one abutment element for defining an abutment for the abutment surface of the protuberance of the band;

the disk being characterized in that the disk has a plurality of separated connection elements for constantly urging the band in an axial direction and keeping the band in axial abutment with the bell, wherein each connection element comprises a fixing portion which cooperates with the bell, abutting the front connection surface of the bell, the fixing portion has a window, and an active portion which cooperates with the braking band, acting on the free front surface of the protuberance housed in the seat of the bell, keeping the abutment surface of the protuberance of the band constantly in abutment with the abutment element of the disk; and the disk has an undeformed configuration of the connection element in which the active portion extends from the fixing portion and is bent onto the fixing portion, extending across the fixing portion in the region of the window.

20. A disk for a disk brake, having an axis of rotation, and comprising:

a braking band for cooperating with a caliper, generating a braking torque, the band being provided with:

at least one protuberance projecting towards the axis of rotation of the disk and defined between a free front surface and an opposed abutment surface;

a bell provided with an annular connection portion defined between a front connection surface and an opposed locating surface, the annular connection portion being provided with at least one seat for housing the protuberance of the band for the transfer of the braking torque from the band to the bell; and at least one abutment element for defining an abutment for the abutment surface of the protuberance of the band, wherein the at least one abutment element is a plate containing two connection holes;

the disk being characterized in that the disk has a plurality of separated connection elements for constantly urging the band in an axial direction and keeping the band in axial abutment with the bell, wherein each connection element comprises a fixing portion which cooperates with the bell, abutting the front connection surface of the bell, and an active portion which cooperates with the braking band, acting on the free front surface of the protuberance housed in the seat of the bell, keeping the abutment surface of the protuberance of the band constantly in abutment with the abutment element of the disk;

the fixing portion of each connection element contains two connection lugs spaced evenly apart from a central window, each connection lug containing a connection hole, and said connection lugs are attached to the front connection surface of the annular connection portion of the bell; wherein the active portion of each connection element is in contact with the free front surface of the protuberance of the braking band; and the at least one abutment element is attached to the bell in a region of the locating surface of the annular connection portion of the bell, and the connection holes of the at least one abutment element are substantially aligned with the connection holes of the connection lugs of the fixing portion of the connection element.

21. A disk brake comprising a disk having an axis of rotation and comprising:

a braking band for cooperating with a caliper, generating a braking torque, the band being provided with:

at least one protuberance projecting towards the axis of rotation of the disk and defined between a free front surface and an opposed abutment surface;

a bell provided with an annular connection portion defined between a front connection surface and an opposed locating surface, the annular connection portion being provided with at least one seat for housing the protuberance of the band for the transfer of the braking torque from the band to the bell; and at least one abutment element for defining an abutment for the abutment surface of the protuberance of the band, wherein the at least one abutment element is a plate containing two connection holes;

the disk being characterized in that the disk has a plurality of separated connection elements for constantly urging the band in an axial direction and keeping the band in axial abutment with the bell, wherein each connection element comprises a fixing portion which cooperates with the bell, abutting the front connection surface of the bell, and an active portion which cooperates with the braking band, acting on the free front surface of the protuberance housed in the seat of the bell, keeping the abutment surface of the protuberance of the band constantly in abutment with the abutment element of the disk;

the fixing portion of each connection element contains two connection lugs spaced evenly apart from a central window, each connection lug containing a connection hole, and said connection lugs are attached to the front connection surface of the annular connection portion of the bell; wherein the active portion of each connection element is in contact with the free front surface of the protuberance of the braking band; and the at least one abutment element is attached to the bell in a region of the locating surface of the annular connection portion of the bell, and the connection holes of the at least one abutment element are substantially aligned with the connection holes of the connection lugs of the fixing portion of the connection element.

* * * * *